(12) United States Patent
Civlin

(10) Patent No.: US 6,671,196 B2
(45) Date of Patent: Dec. 30, 2003

(54) REGISTER STACK IN CACHE MEMORY

(75) Inventor: Jan Civlin, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 119 days.

(21) Appl. No.: 10/086,911

(22) Filed: Feb. 28, 2002

(65) Prior Publication Data

US 2003/0161172 A1 Aug. 28, 2003

(51) Int. Cl.[7] .............................. G11C 7/00; G06F 13/00
(52) U.S. Cl. ...................... 365/49; 365/189.12; 711/132
(58) Field of Search ............................ 365/49, 189.12, 365/189.01; 711/132, 126

(56) References Cited

U.S. PATENT DOCUMENTS

| | | | | |
|---|---|---|---|---|
| 4,875,160 A | * | 10/1989 | Brown, III | 712/228 |
| 5,835,744 A | * | 11/1998 | Tran et al. | 712/208 |
| 5,930,820 A | * | 7/1999 | Lynch | 711/132 |
| 6,230,230 B1 | * | 5/2001 | Joy et al. | 710/200 |

* cited by examiner

Primary Examiner—Son T. Dinh
(74) Attorney, Agent, or Firm—William L. Paradice, III; M & P, LLP

(57) ABSTRACT

A CPU includes a register file including a plurality of architectural registers for storing data loaded from a primary memory for execution by the CPU. A stack cache memory coupled to the register file includes a plurality of cache lines, each of which corresponds to one of the architectural registers and implements a first-in, last-out queue for data spilled from the corresponding architectural register. Data spilled from the register file into the stack cache memory is maintained in the stack cache until subsequently restored to the register file without accessing primary memory. The stack cache memory does not participate in cache writeback operations to primary memory.

25 Claims, 6 Drawing Sheets

REGISTER STACK IN CACHE MEMORY

BACKGROUND

1. Field of Invention

This invention relates generally to microprocessors and specifically to register stack spill and fill operations.

2. Description of Related Art

FIG. 1 shows a typical computer system 100 including a central processing unit (CPU) 102 coupled to a primary memory 104 by a bus 112. CPU 102 is shown to include execution units 105, a register file 106, and a memory controller 110. Execution units 105, which include well-known components such as arithmetic logic units (ALU), process data during execution of a computer program residing in primary memory 104. Memory controller 110 is well-known and controls access to primary memory 104 via bus 112. Primary memory 104 is typically a volatile memory such as DRAM.

Register file 106 includes a plurality of architectural registers that have been designated for holding data associated with the execution of the program's instructions. Specifically, when data residing in primary memory 104 is needed for processing in execution units 105, a load instruction is issued and causes the data to be loaded from primary memory 104 into register file 106. When loaded into register file 106, the requested data is available to execution units 105 for processing. Data processed by execution units 105 may be updated and held in register file 106 for subsequent use.

The number of architectural registers in register file 106 is limited in order to minimize cost and CPU size. As a result, the storage capacity of register file 106 may be exceeded during program execution. When this condition occurs, and it is desired to retain the register data for later use, the register data held in register file 106 are saved to primary memory 104 during a well-known register spill operation, thereby freeing register file resources for new data. When the data spilled from register file 106 is later needed by execution units 105, the data is restored from primary memory 104 to register file 106 during a well-known register fill operation.

Each spill operation that stores register data to primary memory 104 requires access to primary memory 104, and therefore incurs delays associated with arbitrating access to bus 112 and with writing data to primary memory 104. Similarly, each fill operation that retrieves previously spilled data from primary memory 104 into register file 106 incurs delays associated with arbitrating access to bus 112 and with reading data from primary memory 104. The primary memory latencies associated with register spill and fill operations undesirably degrade system performance.

Modern computer systems typically include a cache memory implemented between the CPU and primary memory in order to increase performance. FIG. 2 shows CPU 102 including a cache memory 108 coupled to register file 106 and memory controller 110. Cache memory 108 is a small, fast memory device (such as, for example, an SPAM device) that stores data most recently used by CPU 102 during execution of the computer program. If data requested by an instruction resides in cache memory 108 (a cache hit), the data is provided to register file 106 from cache memory 108 rather than from the much slower primary memory 104. Conversely, if the requested data is not in cache memory 108 (a cache miss), the data is loaded into register file 106 and to cache memory 108 from primary memory 104.

In order to minimize primary memory latencies, data stored in a line of cache memory 108 is usually not written back to primary memory 104 until the cache line is selected for replacement with new data. If data in the cache line selected for replacement has been modified (e.g., dirty data), the data is written back to primary memory 104 in a well-known writeback operation. Otherwise, if the data is unmodified (e.g., clean data), the cache line is replaced without writeback to primary memory 104.

Data spilled from register file 106 is typically routed to primary memory 104 through cache memory 108. If the spilled data has not yet been written back to primary memory 104, but rather still resides in cache memory 108 (a cache hit), a subsequent fill operation may restore the spilled data from cache memory 108 to register file 106 without accessing primary memory 104. However, because data spilled from register file 106 is randomly mapped into cache memory 108 and is subject to the same cache replacement strategies as other data residing in cache memory 108, spilled register data residing in cache memory 108 may be selected for replacement and written back to primary memory 104 at any time. When the spilled data no longer resides in cache memory 108, a cache miss occurs, and the spilled data must be retrieved from primary memory 104, which undesirably incurs primary memory latencies.

SUMMARY

A method and apparatus are disclosed that reduces primary memory latencies for register spill and fill operations. In accordance with the present invention, a central processing unit includes a primary cache memory and a stack cache memory coupled to a register file having a plurality of architectural registers. The primary cache is a conventional cache memory that stores data most recently used by the CPU so that register load operations may be serviced by the primary cache rather than by the primary memory. The stack cache includes a plurality of cache lines, each of which implements a last-in, first out (LIFO) queue for stacking data spilled from the register file. In one embodiment, each architectural register is mapped to a unique stack (e.g., cache line) of the stack cache. In other embodiments, each architectural register may be mapped to multiple unique stacks of the stack cache.

During a register spill operation, data is spilled from an architectural register and stored on top of its dedicated stack implemented in the stack cache. In one embodiment, the top of each stack is indicated using a top-of-stack pointer. The register data stored in the stack cache is maintained in the stack cache. Specifically, the stack cache operates independently of the primary cache, and thus register data stored in the stack cache is not written to the primary memory during writeback operations associated with the primary cache.

During a register fill operation, register data previously spilled from the register stack is popped from the top of the stack and restored into its corresponding architectural register. In this manner, data spilled from the register file may be stacked in the stack cache and later restored to the register file without incurring primary memory latencies.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Present embodiments are discussed below in the context of computer system 300 for simplicity only. It is to be understood that present embodiments are equally applicable to other computer systems. For example, embodiments of the present invention are applicable in pipelined and non-pipelined CPU architectures, and may be implemented in CPUs capable of out-of-order instruction. Further, although system 300 is shown as a having a single CPU, the present invention may be implemented in multi-processor computer architectures. Also, although described below in the context of a computer system employing addressable memory, present embodiments may be implemented in computer systems that utilize stack memory systems. In addition, single signal lines in the accompanying drawings may be replaced by multi-signal buses, and multi-signal buses may be replaced by single signal lines. Accordingly, the present invention is not to be construed as limited to specific examples described herein but rather includes within its scope all embodiments defined by the appended claims.

Figure 1:
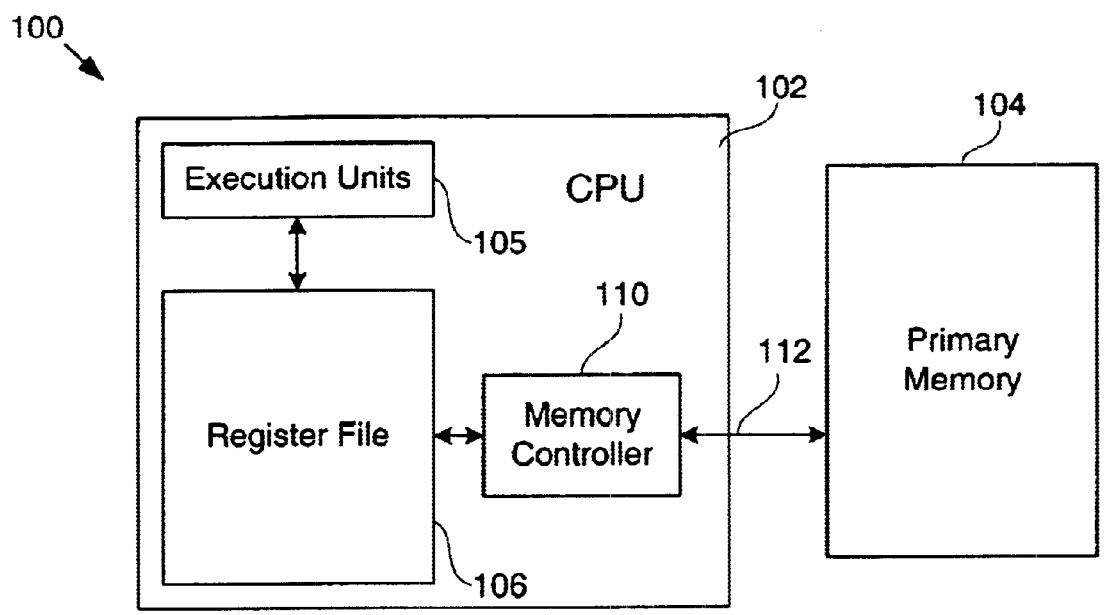
FIG. 1 is a block diagram of a conventional computer system.
Figure 2:
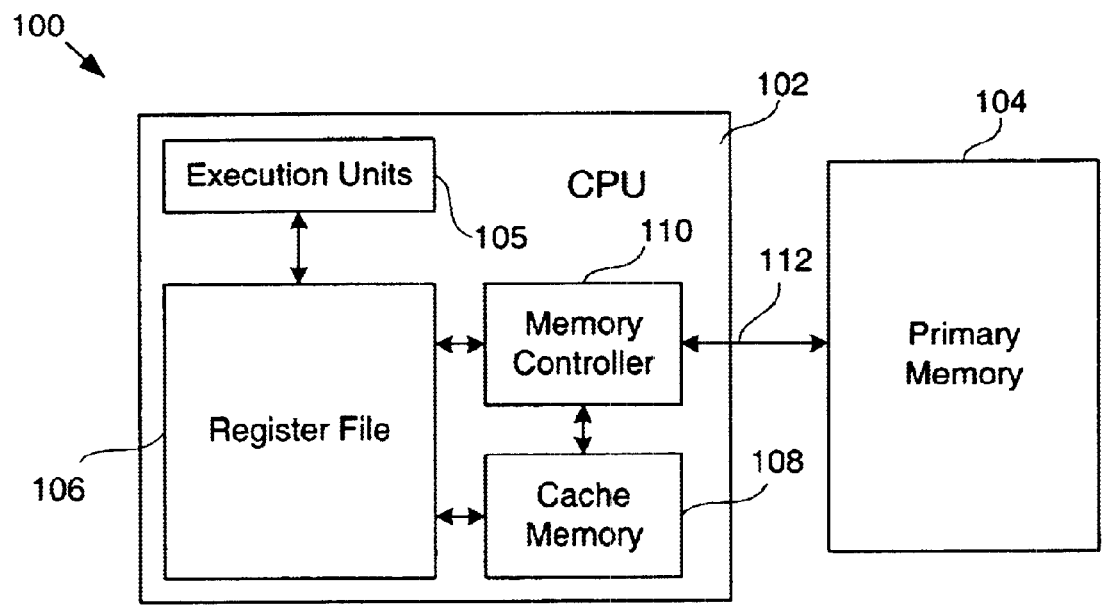
FIG. 2 is a block diagram of a conventional computer system including a cache memory.
Figure 3:
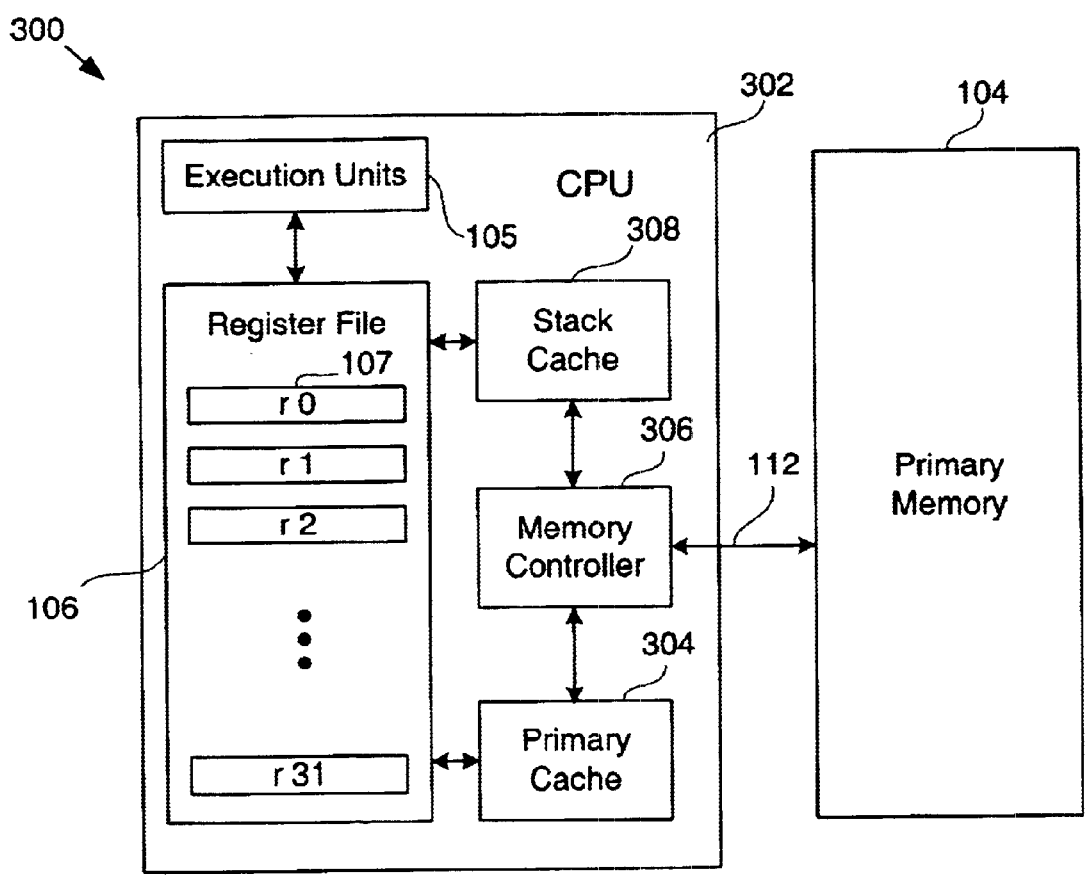
FIG. 3 is a block diagram of a computer system including a central processing unit having a stack cache implemented in accordance with one embodiment of the present invention.

FIG. 3 shows a computer system 300 in accordance with one embodiment of the present invention. System 300 includes a CPU 302 coupled to primary memory 104 via bus 112. Primary memory 104 may be any suitable memory such as, for example, DRAM. CPU 302 includes execution units 105, register file 106, a primary cache memory 304, a memory controller 306, and a stack cache memory 308. Memory controller 306 includes well-known circuitry for controlling primary memory 104. In some embodiments, memory controller 306 may also include circuitry for controlling primary cache 304 and, in one embodiment, may include circuitry for controlling stack cache 308. In other embodiments, stack cache 308 may be controlled by a dedicated memory controller (not shown for simplicity). Execution units 105 may include a plurality of individual execution units such as, for example, floating point execution units (FPUs), integer execution units (IEUs), arithmetic logic units (ALUs), and so on, to process data provided by register file 106. Other well-known elements of CPU 302 are omitted for simplicity. For example, although not shown in FIG. 3, CPU 302 may include well-known instruction fetch and decode units, reorder buffers, a program counter, a system clock, and so on. Thus, the architecture shown in FIG. 3 is an exemplary high-level representation of CPU 302 in one embodiment; the specific architectural configuration of embodiments of FIG. 3 may vary.

Register file 106 is a conventional register file that includes a plurality of architectural registers 107 for storing data used by execution units 105 during the execution of the instructions of a computer program residing in primary memory 104. Register file 106 is shown in FIG. 3 as including 32 registers r0–r31, although in other embodiments register file 106 may include any suitable number of registers 107. In one embodiment, each register 107 is 16 bits, although registers of other lengths may be used.

Primary cache 304 is coupled to register file 106 and memory controller 306. Primary cache 304 is a well-known device such as SRAM that stores data requested from primary memory 104 during load operations to register file 106. Primary cache 304 includes a number of cache lines, and may be divided into an instruction cache for storing instructions fetched from primary memory 104 and a data cache for storing recently requested data from primary memory 104. In addition, primary cache 304 may be a multi-level cache memory device (e.g., having L1, L2, and L3 cache components). Primary cache 304 may employ any suitable cache replacement strategy such as, for example, the commonly known least-recently used (LRU) replacement technique. In one embodiment, data stored in lines of primary cache 304 is written back to primary memory 104 when those lines are selected for replacement, although in other embodiments data may be written from primary cache 304 to primary memory 104 at any suitable time.

Stack cache 308 is coupled to register file 106 and memory controller 306, and stacks data spilled from register file 106 when additional registers 107 are needed. The spilled data is retained in stack cache 308 so that the spilled register data may later be restored to register file 106 from stack cache 308 without accessing primary memory 104. Specifically, unlike data stored in primary cache 304, register data stored in stack cache 308 is not written back to primary memory 104 during conventional writeback operations.

Figure 4:
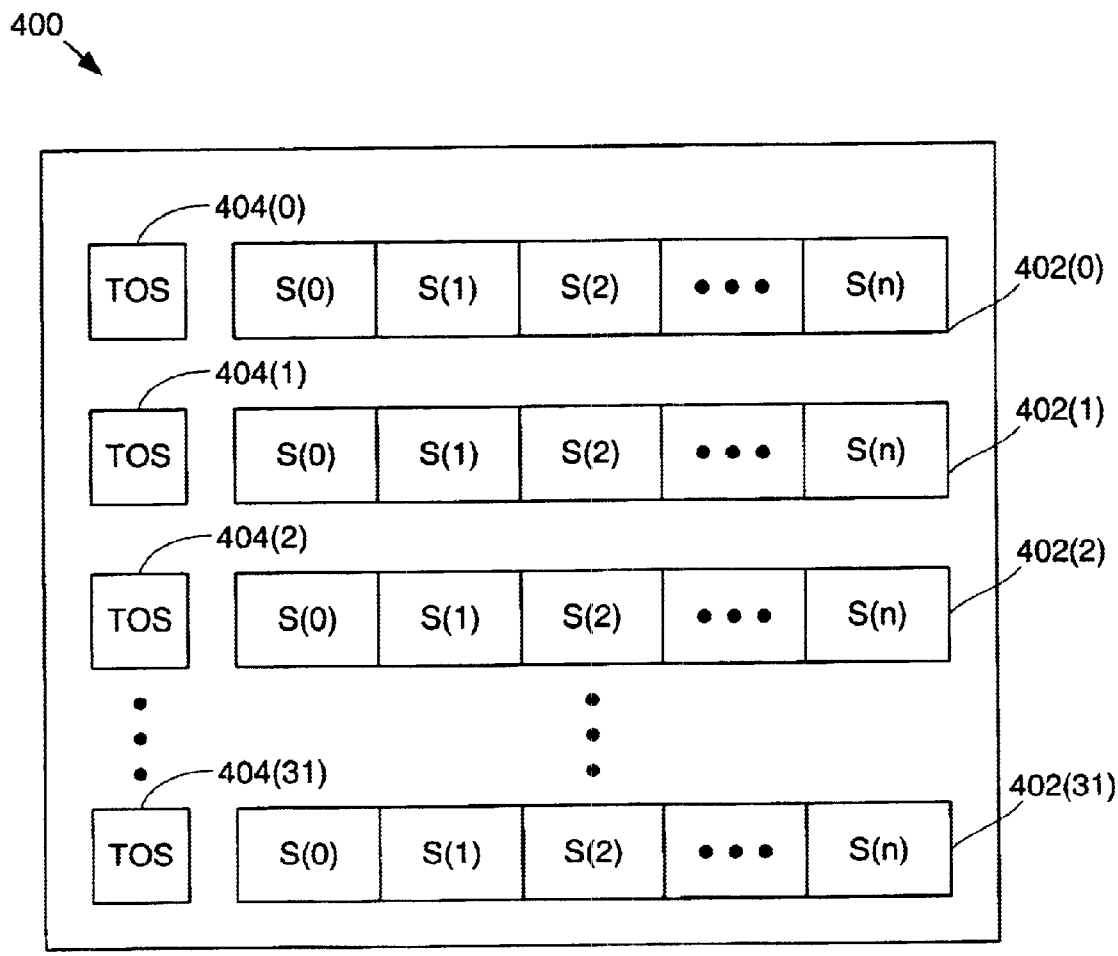
FIG. 4 is a block diagram of one embodiment of the stack cache of FIG. 3.

FIG. 4 shows one embodiment 400 of stack cache 300 of FIG. 3 as having 32 cache lines 402(0)–402(31) of any suitable length. In one embodiment, stack cache lines 402 include 64 bits. Each line 402 of stack cache 400 implements a last-in, first out (LIFO) queue for storing data spilled from a corresponding register 107 of register file 106. In one embodiment, each architectural register 107 is mapped to a unique stack cache line 402. Thus, as illustrated in the example of FIG. 4, the register stack implemented in line 402(0) of stack cache 400 may stack up to n data values s(0)–s(n) spilled from corresponding register r0 of register file 106. Each register stack 402 also includes a pointer 404 to indicate the top of stack (TOS). Pointers 404 may be implemented using any suitable pointer mechanism. The number of register stacks 402 in stack cache 400 may vary depending upon, for example, the number of registers 107 in register file 106. Further, in some embodiments, stack cache 400 may include sufficient numbers of register stacks 402 to allow more than one stack cache line 402 to correspond to each register 107 of register file 106.

During execution of the computer program, data pertaining to the instructions are loaded from primary memory 104 into the register file 106 (and also into primary cache 304). If an additional register 107 is needed, the contents of the register are spilled to and stacked in the corresponding line 402 of stack cache 400. Thus, for example, if register r0 of register file 106 contains data that is needed for subsequent execution and register r0 is needed for new data, the contents of register r0 are spilled into an available portion of register stack 402(0) as indicated by TOS pointer 404(0). Additional data spilled from register r0 may later be pushed onto the stack 402(0) by incrementing TOS pointer 404(*a*) accordingly. The spilled data stored in register stack 402(0) of stack cache 400 is not written back to primary memory 104 during conventional writeback operations associated, for example, with primary cache 304, but is rather maintained in stack cache 400 for subsequent restoring to register file 106.

When data previously spilled from register r0 is later needed for processing in execution units 105, the data may be popped from the top of the register stack 402(0) using TOS pointer 404(0) and restored to register r0 without accessing primary memory 104. In this manner, register spill and fill operations may be performed without incurring primary memory latencies. Further, because stack cache 400 operates independently of primary cache 304 storing register data spilled from register file 106 into stack cache 400 does not interfere with data caching operations of primary cache 304 and, as mentioned above, conventional writeback operations of primary cache 304 do not cause the register stacks in stack cache 400 to be written back to primary memory 104. Thus, in accordance with the present invention, stack cache 400 is dedicated for performing register spill and fill operations without accessing primary memory 104.

Although data stacked in stack cache 400 is not normally written back to primary memory, stack cache 400 includes circuitry to flush register data stored therein to primary memory 104 when stack cache 400 becomes full. In one embodiment, stack cache 400 includes well-known logic for generating a full flag to indicate when one or more of its register stacks 402 are full. When the stack cache full flag indicates that a register stack 402 is full, stack cache 400 causes data stored in the register stack to be flushed (e.g., saved) to primary memory 104. As register data is popped from the register stack 402, data may be returned from primary memory 104 to the register stack 402. Although saving data from stack cache 400 to primary memory 104 and its later retrieval from primary memory 104 into stack cache 400 involve primary memory latencies, these operations may be performed concurrently with spill and fill operations between register file 106 and stack cache 400, thereby allowing associated primary memory latencies to be substantially hidden.

Figure 5:
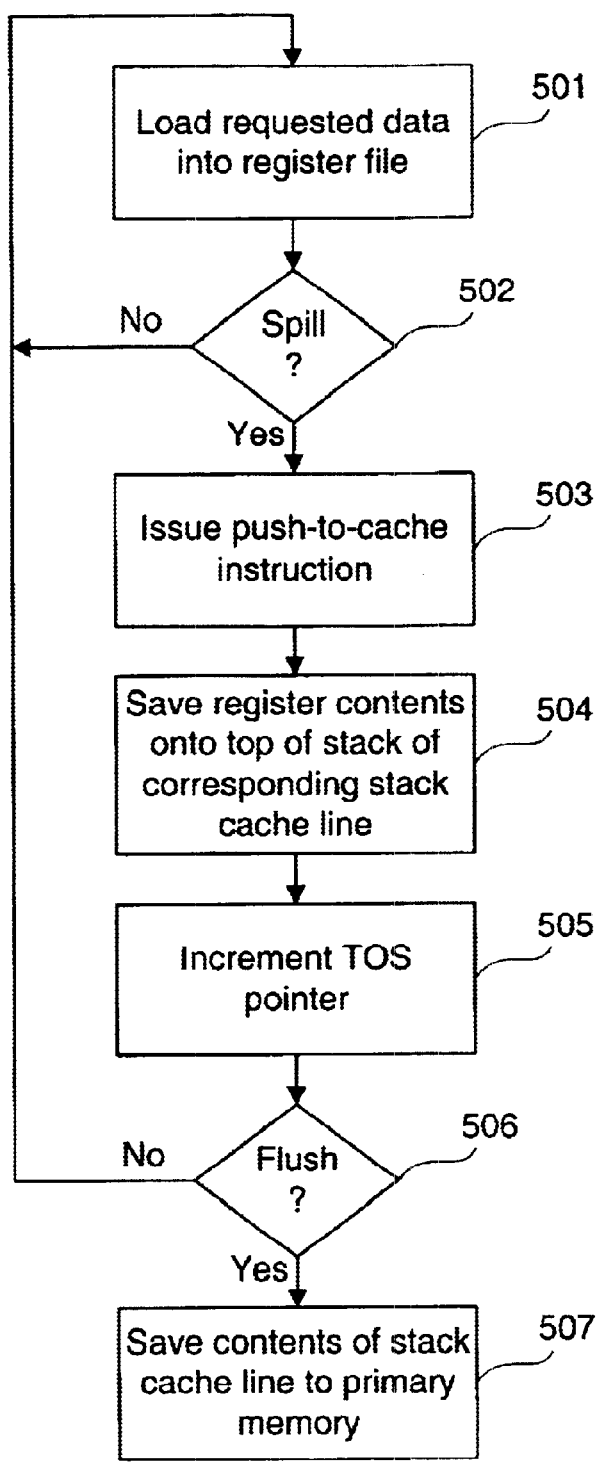
FIG. 5 is a flow chart illustrating one embodiment of a register spill operation for the stack cache of FIG. 4.

An exemplary operation of one embodiment of the present invention in performing a register spill operation is described below with respect to the flow chart of FIG. 5 and the various states of a register stack 402 of stack cache 400 illustrated in FIG. 7. Initially, stack cache 400 does not contain any data, as indicated by the empty stack cache line 402 in FIG. 7A. Thus, the TOS pointers 404 corresponding to register stacks 402 are initialized to zero states. During execution of the computer program, data pertaining to the instructions are loaded from primary memory 104 into the register file 106 using well-known load operations (step 501). If a register 107 contains data that needs to be saved, as tested in step 502, CPU 302 issues a push-to-cache instruction (step 503). The contents of the register 107 are spilled to the corresponding stack 402 in stack cache 400 and stored into the first available position of the stack 402 (step 504). Specifically, the spilled contents are pushed onto the top of the stack 402, as indicated by data0 in FIG. 7B. Then, the TOS pointer 404 for the stack 402 is incremented to indicate the new top of stack (step 505).

Figure 7A:
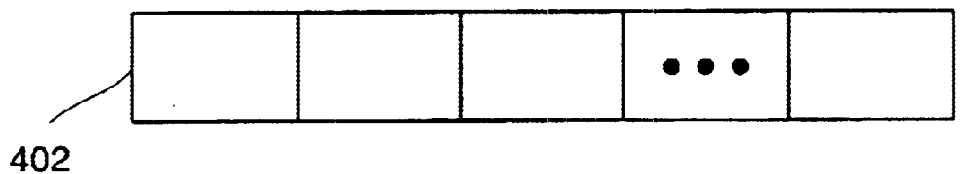
FIGS. 7A–7D illustrate implementation of push-to-cache and pop-from-cache instructions in one embodiment of the stack cache of FIG. 4.
Figure 7B:
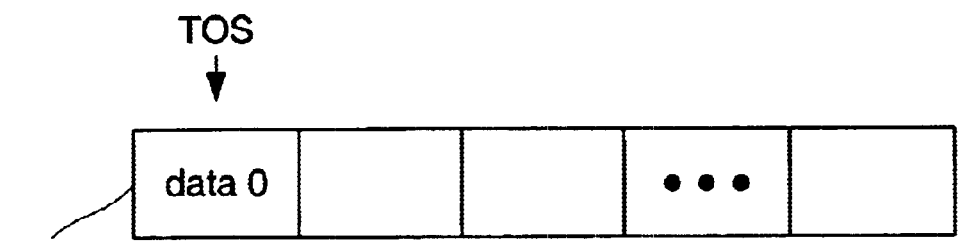
Figure 7C:
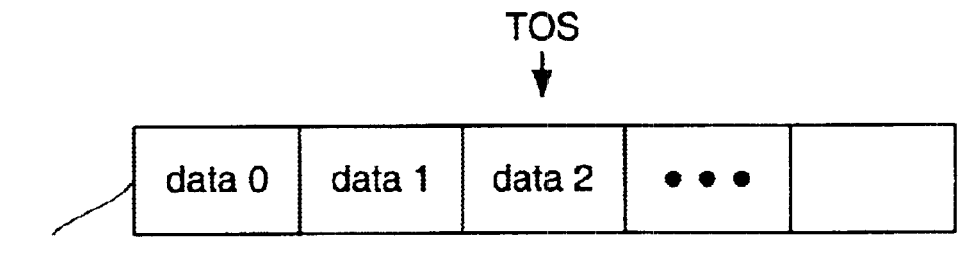

If stack 402 is not full, as tested in step 506, processing returns to step 501, and additional data may be subsequently spilled from the same register 107 onto the corresponding register stack 402 as described in steps 502–505. FIG. 7C illustrates the effect of two additional push-to-cache instructions resulting in a total of three datum (data0, data1, data2) being stacked into stack 402 of stack cache 400. If, on the other hand, the stack 402 is full as indicated, for example, by an asserted full flag for stack cache 400, the contents of stack 402 are flushed to primary memory 104 (step 507). Where more than one of stacks 402 are full, multiple flush operations may be performed in a sequential manner.

Figure 6:
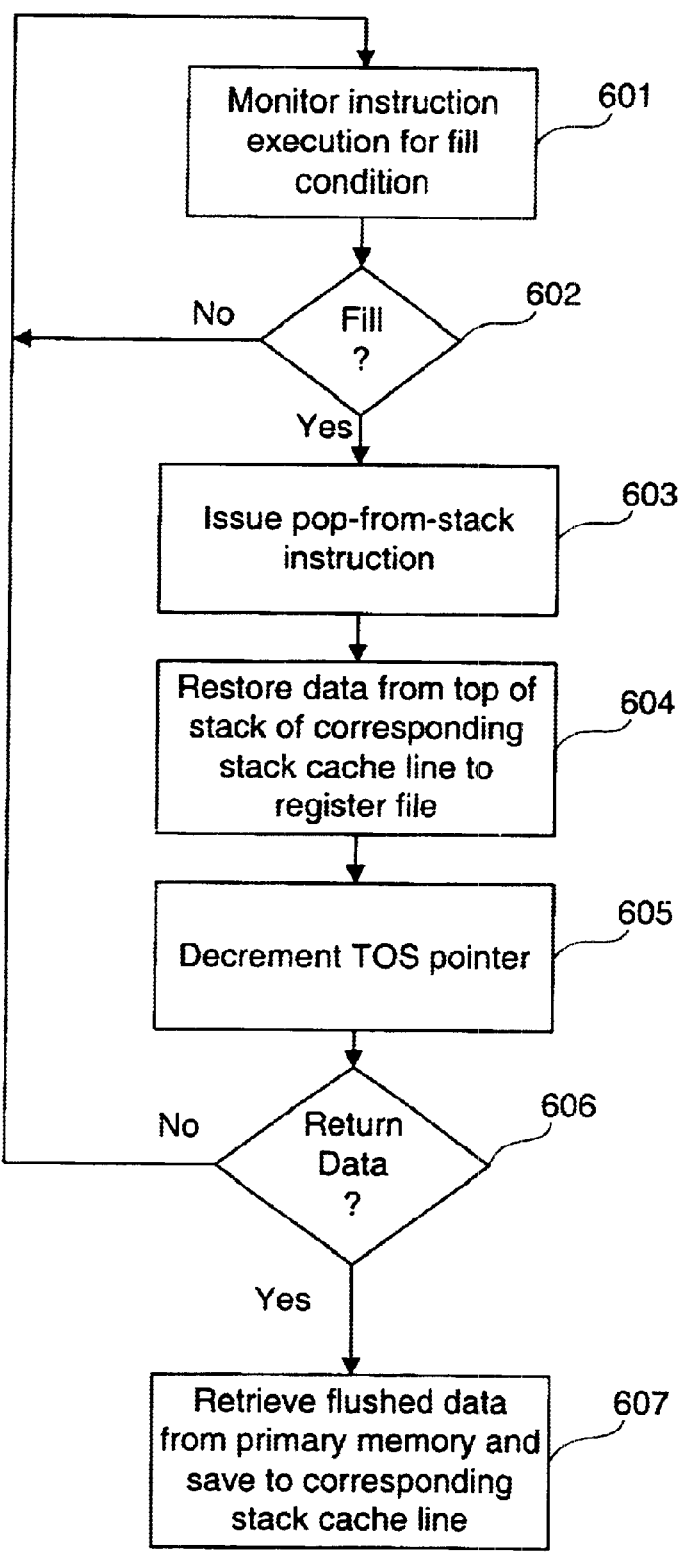
FIG. 6 is a flow chart illustrating one embodiment of a register fill operation for the stack cache of FIG. 4.
Figure 7D:
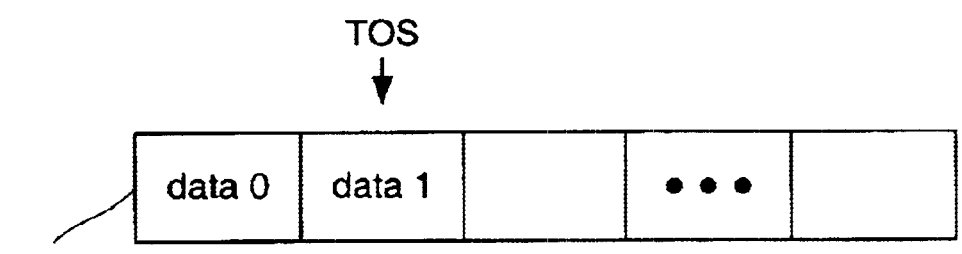

An exemplary operation of one embodiment of the present invention in performing a register fill operation is described below with respect to the flow chart of FIG. 6 and the various states of the stack 402 illustrated in FIG. 7. CPU 302 monitors instruction flow to determine when previously spilled data is needed in the register 107 for processing by execution units 105 (step 601). If fill condition exists, as tested in step 602, CPU 302 issues a pop-from-cache instruction (step 603). The pop-from-cache instruction pops data from the top of the stack 402 (indicated by the TOS pointer) of stack cache 400 and restores the data into the corresponding register 107 (step 604). The TOS pointer 404 is then decremented to indicate the new top of stack for the corresponding register stack 402 (step 605). FIG. 7D illustrates the effect of the pop-from-cache instruction and subsequent decrementing of TOS pointer 404, where data2 has been restored to register file 106 and the TOS pointer now indicates that data1 is at the top of the register stack 402.

If data has been previously flushed from the corresponding register stack 402 in stack cache 400, as tested in step 606, the data is retrieved from primary memory 104 and saved into an available position of register stack 402 (step 607). Otherwise, processing proceeds to step 601. For some embodiments, data that was previously flushed from a register stack 402 of stack cache 400 to primary memory 104 is returned when the register stack 402 is empty in order to minimize access to primary memory 102.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A central processing unit (CPU) of a computer including a primary memory, comprising:
    a register file including a plurality of architectural registers;
    a primary cache memory coupled to the register file, the primary cache memory for caching data loaded into the register file from primary memory; and
    a stack cache memory coupled to the register file in parallel with the primary cache memory, the stack cache memory including a plurality of cache lines dedicated for stacking data spilled from the register file.

2. The CPU of claim 1, wherein each architectural register is mapped to a unique line in the stack cache memory.

3. The CPU of claim 2, wherein each line of the stack cache comprises a register stack that stores data spilled from a corresponding architectural register in a first-in, last-out manner.

4. The CPU of claim 3, wherein each register stack stores multiple data spilled from the corresponding architectural register.

5. The CPU of claim 1, wherein data spilled to the stack cache remains in the stack cache until subsequently restored to the register file.

6. The CPU of claim 5 wherein each register stack further comprises a pointer to indicate a top of the stack.

7. The CPU of claim 1, wherein writeback operations from the primary cache to the primary memory do not affect data stored in the stack cache.

8. A central processing unit (CPU) of a computer including a primary memory, comprising:
   a register file including a plurality of architectural registers, each for storing data to be processed by the CPU; and
   a stack cache memory coupled to the register file, the stack cache memory including a plurality of cache lines, each mapped to a corresponding architectural register and dedicated for storing data spilled from the corresponding the architectural register.

9. The CPU of claim 8, wherein each line of the stack cache comprises a register stack implemented as a first-in, last-out queue.

10. The CPU of claim 9, wherein each register stack of the stack cache stores multiple data spilled from the corresponding architectural register.

11. The CPU of claim 8, wherein data spilled to the stack cache remains in the stack cache until subsequently restored to the register file.

12. The CPU of claim 8, wherein each register stack further comprises a pointer to indicate a top of the stack.

13. The CPU of claim 8, wherein each architectural register is mapped to more than one stack cache line.

14. The CPU of claim 8, further comprising a primary cache memory coupled to the register file, the primary cache memory for caching data loaded into the architectural registers from the primary memory.

15. A central processing unit (CPU) of a computer including a primary memory, comprising:
   a register file including a plurality of architectural registers;
   means for caching data loaded into the register file from primary memory, wherein each architectural register is randomly mapped to locations in the means for caching; and
   means for stacking data spilled from the register file into a plurality of stacks, wherein each architectural register is directly mapped to a unique stack.

16. The CPU of claim 15, further comprising:
   means for performing a writeback operation to the primary memory from the means for caching without affecting data stored in the stack cache.

17. The CPU of claim 15, wherein the means for caching and the means for stacking comprise a primary cache memory and a stack cache memory, respectively, coupled in parallel to the register file.

18. The CPU of claim 15, wherein each stack comprises a first-in, last-out queue.

19. A method of operating a central processing unit (CPU) of a computer coupled to a primary memory and having a plurality of architectural registers, the method comprising:
   providing a stack cache memory dedicated for storing data spilled from the architectural registers;
   mapping each architectural register to a unique line of the stack cache memory; and
   implementing a first-in, last-out stack in each line of the stack cache memory.

20. The method of claim 19, further comprising:
   detecting a spill condition for a first architecture register;
   spilling data stored in the first architectural register into the corresponding stack of the stack cache; and
   maintaining the spilled data in the stack cache memory until subsequently restored to the first architectural register.

21. The method of claim 20, wherein spilling the data comprises:
   issuing a push-to-cache instruction; and
   saving the data to a top of the corresponding stack in the stack cache.

22. The method of claim 21, wherein spilling the data further comprises:
   incrementing a top of stack pointer for the corresponding stack.

23. The method of claim 22, further comprising:
   detecting a register fill condition; and
   restoring the data from the corresponding stack in the stack cache to the first architectural register without accessing the primary memory.

24. The method of claim 23, wherein restoring the data comprises:
   issuing a pop-from-cache instruction; and
   filling the first architectural register with the data from the corresponding stack in the stack cache.

25. The method of claim 24, wherein restoring the data further comprises:
   decrementing the top of stack pointer.

* * * * *